(12) United States Patent
Ichikawa

(10) Patent No.: US 11,228,654 B2
(45) Date of Patent: Jan. 18, 2022

(54) TRACKING DEVICE, TRACKING METHOD, AND TRACKING SYSTEM

(71) Applicant: TOSHIBA TEC KABUSHIKI KAISHA, Tokyo (JP)

(72) Inventor: Takashi Ichikawa, Tagata Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/813,667

(22) Filed: Mar. 9, 2020

(65) Prior Publication Data
US 2020/0358863 A1 Nov. 12, 2020

(30) Foreign Application Priority Data
May 9, 2019 (JP) .............................. JP2019-089209

(51) Int. Cl.
*H04L 29/08* (2006.01)
*G06T 7/73* (2017.01)
(Continued)

(52) U.S. Cl.
CPC .......... *H04L 67/22* (2013.01); *G06K 9/00771* (2013.01); *G06K 9/2054* (2013.01);
(Continued)

(58) Field of Classification Search
CPC .......... H04L 67/22; H04W 4/029; G06T 7/23; G06K 9/2054
See application file for complete search history.

(56) References Cited

U.S. PATENT DOCUMENTS

2004/0189813 A1 9/2004 Tanaka
2014/0064560 A1* 3/2014 Gornick ........... G08B 13/19608
382/103
(Continued)

FOREIGN PATENT DOCUMENTS

JP 2005347905 A 12/2005

OTHER PUBLICATIONS

Extended European Search Report dated Sep. 29, 2020 in corresponding European Patent Application No. 20169189.6, 8 pages.

*Primary Examiner* — Myron Wyche
(74) *Attorney, Agent, or Firm* — Kim & Stewart LLP

(57) ABSTRACT

A tracking device includes an interface connectable to cameras, each acquiring an image and determining an object location within the image, a distance therefrom, and a time; a memory storing first coordinates indicating a camera location with respect to a reference point in a facility, and a first direction towards which each camera faces; and a processor, upon receipt of the location, the distance, and the time, calculating a second direction from the camera to the object, calculating second coordinates indicating an object location with respect to the camera location, calculating and storing with the time third coordinates indicating an object location with respect to the reference point. When locations calculated from the images acquired by the first and second cameras are associated with the same time, the processor calculates a distance therebetween, and when the distance falls within a predetermined range, recalculates the object location based on the locations.

20 Claims, 12 Drawing Sheets

(51) Int. Cl.
*H04W 4/029* (2018.01)
*G06K 9/00* (2006.01)
*G06K 9/20* (2006.01)
*G06K 9/32* (2006.01)

(52) U.S. Cl.
CPC .............. *G06K 9/3216* (2013.01); *G06T 7/73* (2017.01); *H04W 4/029* (2018.02)

(56) References Cited

U.S. PATENT DOCUMENTS

| | | |
|---|---|---|
| 2016/0269685 A1 | 9/2016 | Jessop et al. |
| 2017/0339348 A1 | 11/2017 | Shimizu et al. |
| 2018/0341818 A1 | 11/2018 | Steffanson et al. |
| 2019/0096082 A1 | 3/2019 | Di et al. |

* cited by examiner

US 11,228,654 B2

TRACKING DEVICE, TRACKING METHOD, AND TRACKING SYSTEM

This application is based upon and claims the benefit of priority from Japanese Patent Application No. 2019-089209, filed on May 9, 2019, the entire contents of which are incorporated herein by reference.

FIELD

Embodiments described herein relate generally to a tracking device, a tracking method, and a tracking system.

BACKGROUND

Techniques for tracking a person's location by monitoring changes in an area within an image obtained by a camera.

However, since the image obtained by the camera does not contain any distance information on the distance from the camera to the person, the person's movement cannot be tracked in detail.

Under such circumstances, it has been desired to be able to track the movement of an object such as a person with high accuracy.

DETAILED DESCRIPTION

In general, according to one embodiment, a tracking device for tracking a location of an object within a facility, includes an interface circuit connectable to a plurality of cameras including a first and a second camera, each of which configured to acquire an image and determine a location of an object within the image, a distance between the object and the camera, and a time when the image is acquired, a memory that stores first coordinates that indicate a location where each of the cameras is installed with respect to a reference point predetermined in the facility, and a first direction towards which each of the cameras faces; and a processor configured to, upon receipt of the location of the object within the image, the distance, and the time from each of the cameras, calculate a second direction from the camera to the object in the facility based on the stored first direction and the received location of the object within the image, based on the calculated second direction and the received distance, calculate second coordinates indicating a location of the object with respect to the location where the camera is installed, based on the stored first coordinates and the calculated second coordinates, calculate third coordinates indicating a location of the object with respect to the reference point of the facility, and store, in the memory, the calculated third coordinates together with the received time. The processor is further configured to, when a first location represented by the third coordinates calculated from the image acquired by the first camera and a second location represented by the third coordinates calculated from the image acquired by the second camera are stored in the memory in association with a same time, calculate a distance between the first and second locations, and when the distance falls within a predetermined range, recalculate a location of the object based on the first and second locations.

Figure 1:
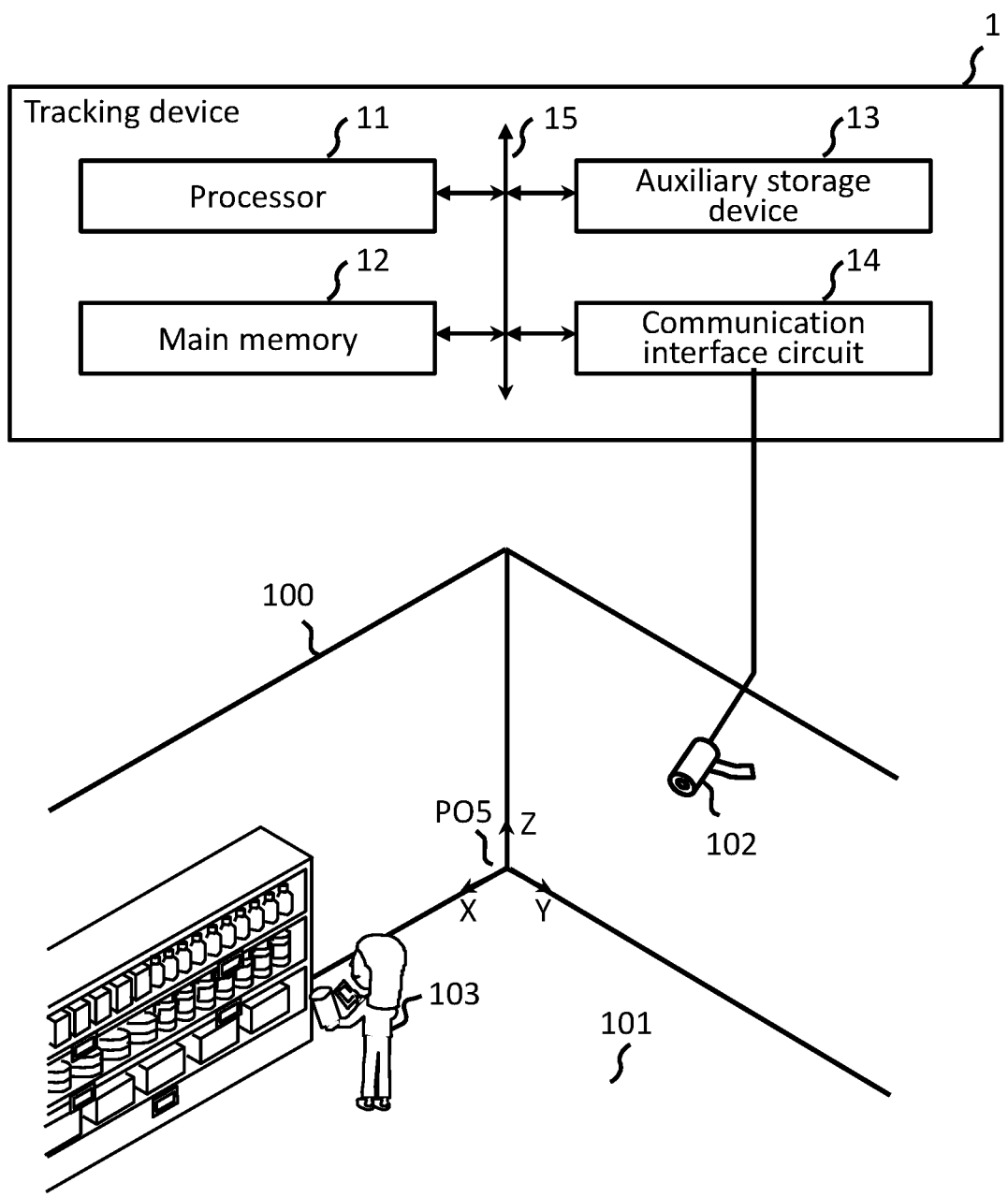
FIG. 1 is a block diagram illustrating a configuration of a tracking device according to a first embodiment.

Hereinafter, an example of the embodiment will be described with reference to the drawings. FIG. 1 is a block diagram showing a configuration of a tracking device 1 according to a first embodiment. The tracking device 1 tracks the movement of a person 103 in a sales room 101 of a store 100 by photographing the person 103 using a plurality of intelligent cameras 102 installed on a wall of the sales room 101.

The intelligent camera 102 captures a moving image. The intelligent camera 102 determines a region (hereinafter referred to as a recognition area) in which the person 103 is shown in the captured moving image. The intelligent camera 102 measures a distance from the intelligent camera 102 to the person 103. The distance measurement method may be any method such as a stereo camera method or a ToF (time of flight) method. The intelligent camera 102 outputs detection data including a region data specifying the recognition area and a distance data representing the measured distance every time the new recognition area is determined.

The tracking device 1 includes a processor 11, a main memory 12, an auxiliary storage device 13, a communication interface circuit 14, and a transmission line 15. The processor 11 corresponds to the central part of a computer. The processor 11 executes information processing for performing various functions of the tracking device 1 according to an information processing program such as an operating system, middleware and an application program.

The main memory 12 includes a nonvolatile memory region (e.g., ROM) and a volatile memory region (e.g., RAM). The main memory 12 stores the above-mentioned information processing program in the nonvolatile memory region. In addition, the main memory 12 may store data necessary for executing the information processing program in the nonvolatile or volatile memory region. The main memory 12 uses the volatile memory region as a work area in which data is appropriately rewritten by the processor 11.

The auxiliary storage device 13 may be, for example, an EEPROM (electric erasable programmable read-only memory), an HDD (hard disc drive), an SSD (solid state drive), or any other known storage device. The auxiliary storage device 13 stores data used for the processor 11 to perform various processes, and data generated by the processor 11. The auxiliary storage device 13 may store the information processing program described above.

The communication interface circuit 14 performs data communication with the intelligent camera 102 via a communication cable or a radio wave. As the communication interface circuit 14, for example, a well-known communication device conforming to the USB (universal serial bus) standard or the LAN (local area network) standard, or the WLAN (wireless LAN) standard may be used. The transmission line 15 includes an address bus, a data bus, a control signal line, and the like, and transmits data and control signals to be exchanged between the connected components.

The tracking device 1 stores an information processing program in the main memory 12 or the auxiliary storage device 13, and information processes to be mentioned below is performed by the processor 11

The information processing program may be stored in the main memory 12 or the auxiliary storage device 13 before shipment or transfer, or may be downloaded via a network after shipment or transfer. In the latter case, the information processing program may be recorded on a removable recording medium such as a magnetic disk, a magneto-optical disk, an optical disk, a semiconductor memory, or the like.

The operation of the tracking device 1 configured as described above will now be described. When the person 103 is in a state to be tracked, the processor 11 performs the information processing (hereinafter referred to as tracking processing) described below in accordance with the information processing program stored in the main memory 12 or the auxiliary storage device 13. The processor 11 executes the tracking processing individually for each of the plurality of intelligent cameras 102.

Figure 2:
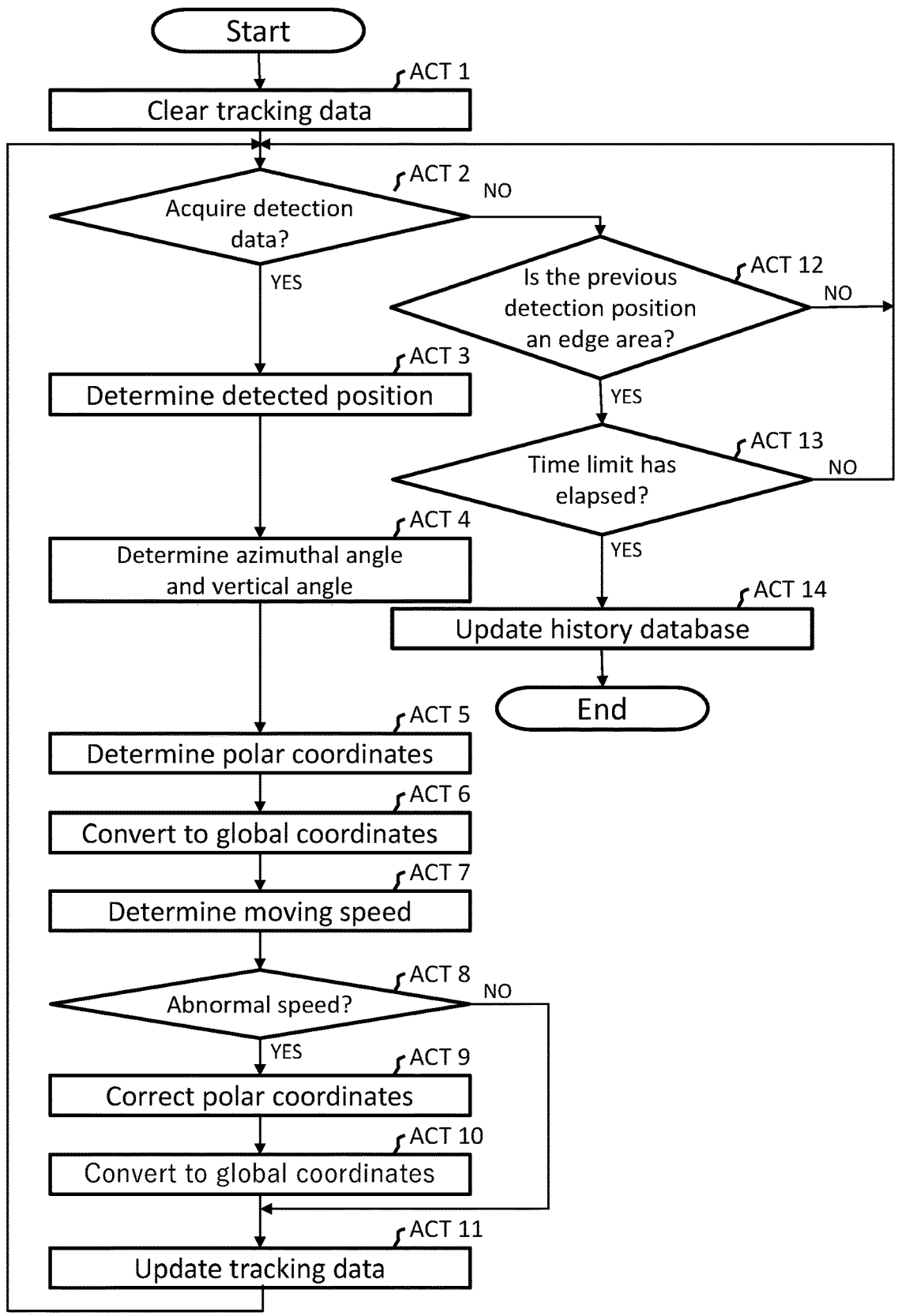
FIG. 2 is a flowchart of a tracking processing performed by the tracking device.

FIG. 2 is a flowchart of the information processing performed by the processor 11. The contents of the processing described below are merely examples, and a change in the order of some processing, an omission of some processing, an addition of another processing, and the like are possible as appropriate. As ACT1, the processor 11 clears the tracking data stored in the main memory 12 or the auxiliary storage device 13. The tracking data is associated with a person 103 and represents a change over time in a location determined based on the results of the detection by the one intelligent camera 102 for the person 103.

Figure 3:
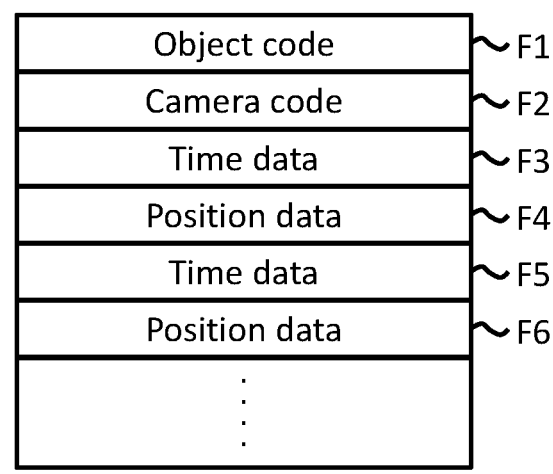
FIG. 3 is a diagram schematically showing structure of tracking data collected by the tracking device.

FIG. 3 is a diagram schematically showing structure of tracking data collected by the tracking device 1. As shown in FIG. 3, the tracking data includes fields F1, F2, F3, and F4. The tracking data may also include fields F5 and F6. The field F1 indicates an object code for identifying the person 103 to which the tracking data is associated, as a subject of tracking processing to be described later. The field F2 indicates a camera code for identifying the intelligent camera 102 used for the position determination. The field F3 indicates time data indicating the time at which the position has been determined. The field F4 indicates position data indicating the position of the subject at the determination time indicated by the time data set in the field F3. Thus, the tracking data is represented as a set of two fields of fields F3 and F4, and is represented as the result of the determination of the one position. After the field F5, a pair of fields may be added. The time data and the position data are set in the two fields similarly to the fields F3 and F4. In ACT11 in FIG. 2 described later, the processor 11 selects the object code so as to be different from the object code set in the field F1 of the other tracking data in accordance with a predetermined rule, and sets the selected object code in the field F1. The processor 11 also sets the camera code previously assigned to one of the intelligent cameras 102 to the field F2. Then, the processor 11 clears the field F3 or the subsequent field F3.

Figure 4:
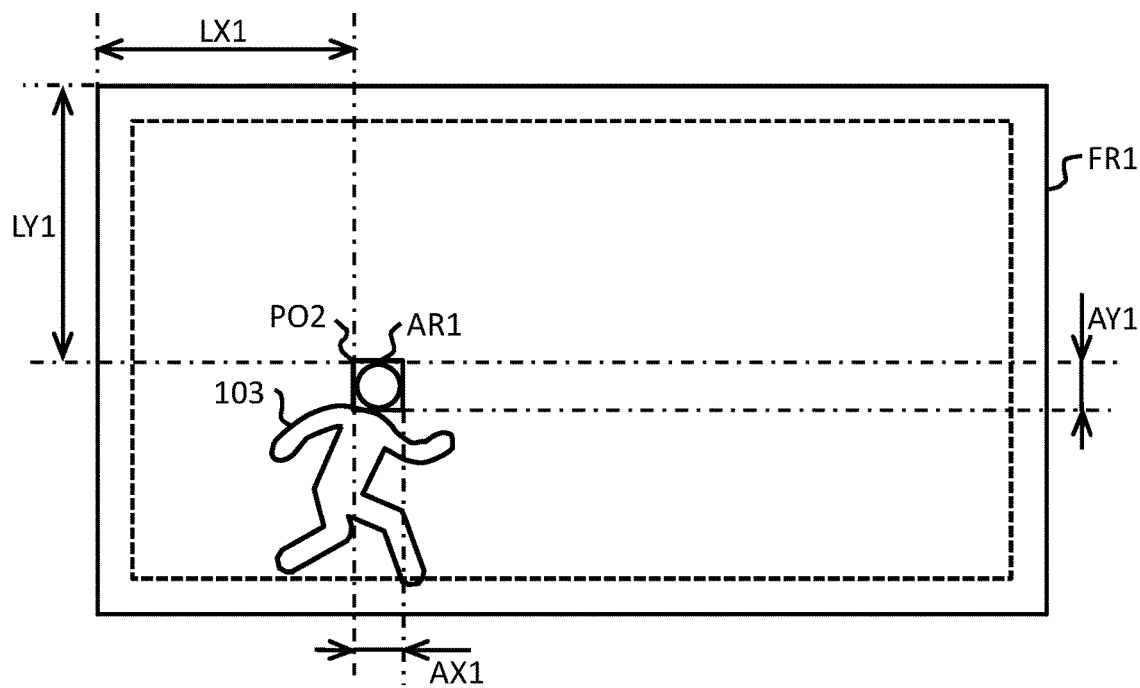
FIG. 4 is a diagram for explaining a determination made within a recognition area of a camera by the tracking device according to the first embodiment.
Figure 5:
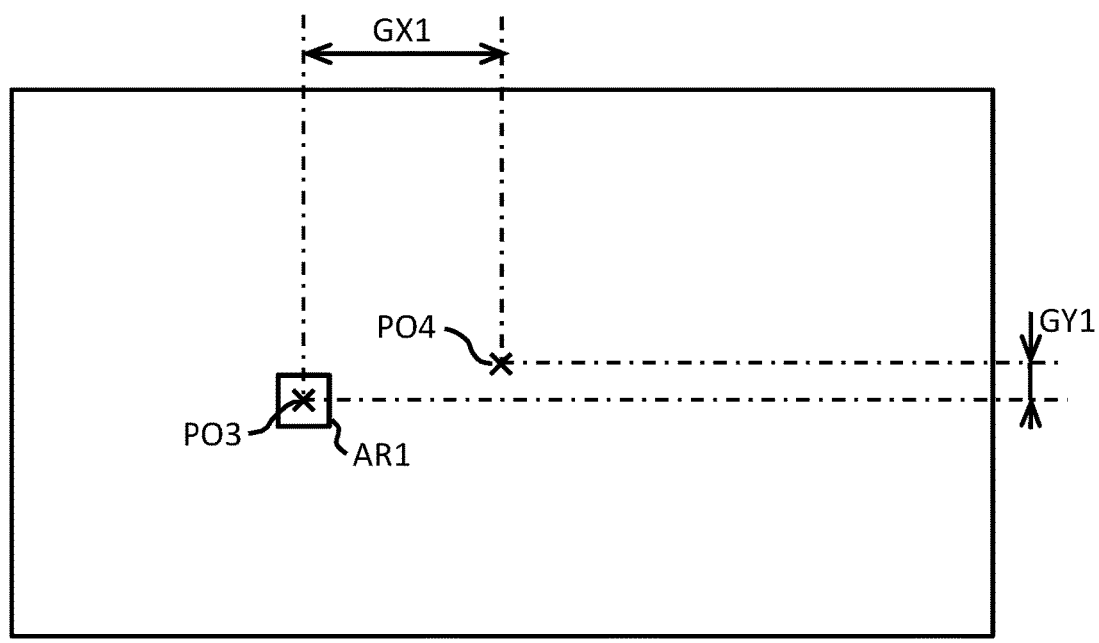
FIG. 5 is a diagram showing a detected position within the recognition area.

When the intelligent camera 102 is in an operation state for detecting a person, it always captures a moving image, and tries to determine a recognition area based on the moving image. FIG. 4 is a diagram for explaining a determination made within a recognition area of the intelligent camera 102. As an example, the intelligent camera 102 sets a rectangular area including an area recognized as the head of the person 103 in the frame FR1 of the moving image as the recognition area AR1. The intelligent camera 102 generates region data indication (i) the X coordinate and the Y coordinate representing the position PO2 of the upper left corner of the recognition area AR1 in the 2D coordinate system in which the upper left corner of the frame FR1 is set as the origin PO1, and (ii) the number of dots of AR1 in the X direction AX1 (hereinafter referred to as the X size) and the number of dots of AR1 in the Y direction AY1 (hereinafter, referred to as the Y size). As an example, the intelligent camera 102 expresses the X coordinate and the Y coordinate as dots LX1 and LY1 in the leftward direction and the downward direction from the origin PO1. For example, the intelligent camera 102 generates time data indicating a time at which the recognition area is determined, and generate detection data including the region data and the time data.

When the person 103 to be tracked does not fall within the photographing range of the intelligent camera 102, the intelligent camera 102 does not output the detected data. When the head of the person 103 moving the sales room 101 enters within the photographing range of the intelligent camera 102 and is reflected in the captured moving image, the intelligent camera 102 outputs the detection data corresponding to the position in the moving image of the head of the person 103. The intelligent camera 102 then outputs the detection data corresponding to the position every time the head position changes, as long as the person 103 remains within the photographing range. That is, the output of the detected data by the intelligent camera 102 becomes irregular. Prior to outputting the detected data, the intelligent camera 102 requests the tracking device 1 to collect the detected data.

The processor 11 acquires, via the communication interface circuit 14, the detected data in response to the request from the intelligent camera 102. In response to this instruction, the communication interface circuit 14 receives the detection data output from the intelligent camera 102, and the detected data is stored in the main memory 12 or the auxiliary storage device 13.

As ACT2 in FIG. 2, the processor 11 confirms whether or not the detected data has been acquired. If the detected data has been acquired (ACT2, YES), the processor 11 proceeds to ACT3. In ACT3, the processor 11 determines the center of the region data included in the detected data, as the detected position of the person 103. For example, the processor 11 determines a position specified by CX1 and CY1 calculated by the following formula are set as the detection positions of the person 103 shown in FIG. 3.

$$CX1=(LX1+AX1/2)$$

$$CY1=(LY1+AY1/2)$$

FIG. 4 is a diagram showing the detected position PO3 of the person 103 within the recognition area AR1 shown in FIG. 3. The detection position may be a position having a predetermined relationship with respect to the recognition area. For example, the position PO2 may be used as the detected position of the person 103 instead.

As ACT4 in FIG. 2, the processor 11 determines the azimuthal angle and the vertical angle formed between the photographing center direction of the intelligent camera 102 and the direction from the intelligent camera 102 to the detected position. The intelligent camera 102 includes an optical system having a large number of imaging elements arranged in two dimensions. The imaging elements located in the center of them receives light coming from the photographing center direction. In addition, the imaging elements positioned around the center-located imaging elements receives light coming from a direction different from the photographing center direction. As a result, the intelligent camera 102Captures an image with a certain angle of view. Therefore, as the distance from the center position PO4 of the frame FR1 to the detected position PO3 is larger, the angle formed between the photographing center direction and the direction to the detected position PO3 becomes larger. The relationship between the distance and the magnitude of the angle is determined by the optical characteristics of the intelligent camera 102.

Then, the processor 11 calculates a distance GX1 in the horizontal direction between the detection position PO3 and the center position PO4, and determines the angle corresponding to the distance GX1 as the azimuthal angle θH1. The processor 11 also calculates a distance GY1 in the vertical direction between the detection position PO3 and the center position PO4, and determines an angle corresponding to the distance GY1 as a vertical angle θV1. The processor 11 may determine the angle corresponding to the distance by a predetermined arithmetic operation in consideration of the characteristics of the optical system of the intelligent camera 102, or may refer to the table data representing the angle in association with the distance. In the optical system, it is desirable that the distance and the angle are related to each other so as to reduce the influence of the distortion characteristic. Here, the center position PO4 coincides with the photographing center direction of the intelligent camera 102. That is, the azimuthal angle θH1 and the vertical angle θV1 indicates the deviation amount between the direction from the intelligent camera to the detected position and the photographing center direction.

The azimuthal angle θH1 and the vertical angle θV1 are both based on the direction of the photographing center of the intelligent camera 102. The photographing center direction of the intelligent camera 102 often has an inclination with respect to the global coordinates. The global coordinates are coordinates within a predetermined 3D coordinate system in order to specify a position within the floor 101. The global coordinates are represented by X coordinate, Y coordinate and Z coordinate based on the reference position PO5 defined at the end of the floor as shown in FIG. 1, for example. The global coordinate system may be a logical coordinate system, and may be defined in any way.

As ACT5, the processor 11 determines polar coordinates in the global coordinate system for the detection position PO3. For example, the processor 11 adds the inclination of the global coordinates in the photographing center direction of the intelligent camera 102 to the X direction to the azimuthal angle θH1, thereby calculating the azimuthal angle θH2 in the global coordinate system for the detection position PO3. Further, the processor 11 calculates the vertical angle θV2 in the global coordinate system for the detection position PO3 by adding the inclination of the global coordinate in the photographing center direction of the intelligent camera 102 to the Z direction to the vertical angle θV1, for example. Then, the processor 11 determines the polar coordinates of the detection position PO3 (DI1, θV2, θH2) based on the azimuthal angle θH2, the vertical angle θV2 and distance DI3 indicated by distance data included in the detection data.

As ACT6, the processor 11 converts the polar coordinates (DI1, θV2, θH2) into global coordinates. The processor 11 calculates, for example, the following three equations to obtain the global coordinates (X1, Y1, Z1) where the global coordinates of the known intelligent camera 102Are represented by (X2, Y2, Z2).

$$X1 = DI1 * \sin\theta V2 * \cos\theta H2 + X2$$

$$Y1 = DI1 * \sin\theta V2 * \sin\theta H2 + Y2$$

$$Z1 = DI1 * \cos\theta V2 + Z2$$

As ACT7, the processor 11 determines the moving speed of the person 103. For example, when the ACT7 is executed from the start of the information processing shown in FIG. 2 for the first time, the processor 11 sets the moving speed to 0. For example, when the ACT3 is repeated as described later, the processor 11 determines, as the moving speed, a value obtained by dividing the distance between the global coordinates determined by the execution of the previous ACT6 and the global coordinates determined by the execution of the current ACT6 by the time difference between the time indicated by the time data included in the previous detection data and the time indicated by the time data included in the detected data. In other words, in this case, the processor 11 calculates the following equation:

$$\sqrt{\{(X1c-X1p)^2+(Y1c-Y1p)^2+(Z1c-Z1p)^2\}}/\Delta T$$

where the global coordinates determined by the execution of the previous ACT6 is expressed by (X1p, Y1p, Z1p), the global coordinates determined by the execution of the current ACT6 is expressed by (X1c, Y1c, Z1c), and the time difference is expressed by ΔT.

That is, the moving speed determined in this example is the average moving speed when the person 103 moves between two detection positions determined in the two times consecutive position determinations.

As ACT7, the processor 11 confirms whether or not the detection data is abnormal. If the moving speed of the person 103 determined from the detection data is extremely fast, the processor 11 determines that the detection data is abnormal. For example, the processor 11 confirms whether or not the moving speed determined in ACT7 is equal to or greater than a predetermined threshold value. If it is equal to or greater than the threshold value, it is determined that there is an abnormality, and the process proceeds to ACT9.

As ACT9, the processor 11 corrects the polar coordinates. For example, the processor 11 replaces the distance DI1 with the value indicated by distance data included in the previous detection data. At this time, the processor 11 does not correct the vertical angle θV2 and the azimuthal angle θH2 of the polar coordinates (DI1, θV2, θH2) determined in ACT5. That is, instead of using the distance measured with respect to the current detection position PO3, the distance measured last time is used instead. Then, the vertical angle θV2 and the azimuthal angle θH2 determined with respect to the current detection position PO3 are used as they are. That is, because the vertical angle θV2 and the azimuthal angle θH2 are based on the position at which the person is actually reflected in the moving image, their accuracy is high. In contrast, the distance measurement by the stereo camera method and the ToF method may not be accurate depending on the environmental condition. For this reason, a major cause of an abnormal moving speed is an erroneous distance measurement, so the accuracy of tracking may be improved by not using such an incorrect distance.

In this way, it is determined that there is an abnormality in the ACT9 in the event that there is an abnormality in the distance data.

As ACT10, the processor 11 converts the polar coordinates corrected in ACT9 to global coordinates in the same manner as ACT6. Thereafter, the processor 11 proceeds to ACT11. When the moving speed is less than the threshold, the processor 11 determines NO in ACT8 as not abnormal, passes ACT9 and ACT10, and proceeds to ACT11. As ACT11, the processor 11 updates the tracking data. For example, when the ACT10 is executed, the processor 11 updates the tracking data so that the tracking data includes the following two fields: (i) the time data included in the current detection data, and (ii) the global coordinates obtained in the ACT10 as the position data. On the other hand, when the ACT10 is passed, the processor 11 updates the tracking data so that the tracking data includes the following two fields: (i) the time data included in the current detection data, and (ii) the global coordinates obtained in the ACT6 as the position data.

Then, the processor 11 then returns to ACT2. Thus, in the case where the head of the person 103 continues to exist within the photographing range of the intelligent camera 102 and the detection data is repeatedly output from the intelligent camera 102, the processor 11 repeatedly executes ACT3 to ACT11. That is, the processor 11 adds (i) a field of global coordinates obtained based on the detected data to be repeatedly outputted as position data, and (ii) a field of time data. In other words, the processor 11 adds the following two fields to the tracking data as a set, i.e., the field in which the global coordinates respectively obtained based on detection data output repeatedly are set, and the field in which the time data is set. Thus, the tracking data is obtained by tracking the position of the head of the person 103.

When the detection data is not captured, the processor 11 determines NO in ACT2, and proceeds to ACT12. As ACT12, the processor 11 confirms whether or not the detection position PO3 determined when the ACT3 has been executed last time is within an edge region, which is a predetermined region in the edge portion of the frame FR1 as shown in FIG. 3, i.e., between a rectangle drawn by dashed lines and the outer border of FR1. Then, the processor 11 determines NO in ACT12 when the previous detection position PO3 is not within the edge region, and returns to the ACT2 as it is. That is, as the ACT2 and ACT12, the processor 11 waits for the detection data to be fetched only if the previous detection position PO3 is inside or within the edge region, i.e., within the inner border of the edge region drawn by the dashed lines in FIG. 3 and within the edge region.

However, if the data is not detected and the previous detection position PO3 is within the edge region, the processor 11 determines YES in ACT12, and proceeds to ACT13. As ACT13, the processor 11 confirms whether or not a predetermined limit time has elapsed in a state in which the detection data is not captured. When the time limit has not elapsed, the processor 11 determines NO, and returns to ACT2 as it is. Thus, the processor 11 waits for the detection data to be captured or for the time limit to elapse, if the previous detection position PO3 was within the edge region. Then, when the predetermined limit time has elapsed while the detection data is not captured, the processor 11 determines NO in ACT13, and proceeds to ACT14.

As ACT14, the processor 11 updates a history database stored in the main memory 12 or the auxiliary storage device 13. The history database is a collection of the tracking data. The processor 11 updates the history database so as to include tracking data stored in the main memory 12 or the auxiliary storage device 13. The processor 11 also includes an identification code for identifying individual tracking data in the tracking data to be added to the history database. Then, the processor 11 ends the tracking processing shown in FIG. 2.

As described above, the processor 11 performs the above-described tracking processing individually for each of the plurality of intelligent cameras 102. Thus, the generation of a plurality of tracking data may be simultaneously performed. Many of the plurality of intelligent cameras 102 are provided to overlap at least a portion of the photographing range with the other intelligent cameras 102. For this reason, all of the plurality of pieces of tracking data generated at the same time may be related to the same person 103, or may be related to the individual person 103.

Figure 6:
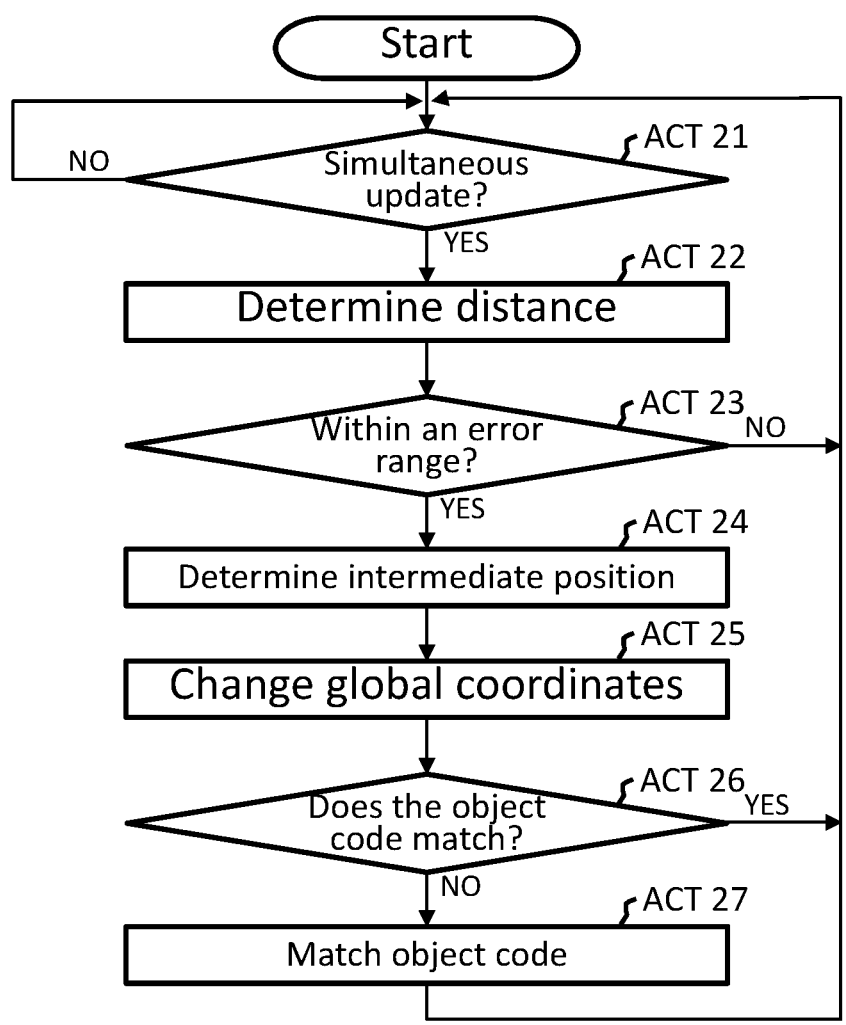
FIG. 6 is a flowchart of a correction processing performed by the tracking device.

The processor 11 executes correction processing described below, separately from the tracking processing described above. FIG. 6 is a flowchart of the correction processing performed by the processor 11.

As ACT21, the processor 11 waits for the plurality of tracking data to be updated at the same time. For example, when the tracking data corresponding to the first tracking processing (hereinafter referred to as first tracking data) and the tracking data corresponding to the other tracking processing (hereinafter referred to as second tracking data) are both updated and the time data added thereby are the same as each other, the processor 11 determines YES as a simultaneous update, and proceeds to ACT22.

As ACT22, the processor 11 determines the distance between the global coordinates newly added to the first and second tracking data, respectively. For example, when the global coordinates (hereinafter referred to as first global coordinates and second global coordinates) added to the first and second tracking data are represented by (X1A, Y1A, Z1A) and (X1B, Y1B, Z1B), the processor 1 calculates the following equation.

$$\sqrt{\{(X1A-X1B)2+(Y1A-Y1B)2+(Z1A-Z1B)2\}}$$

When the two intelligent cameras 102Are in a state in which the person 103 is photographed, the first and second tracking data may be updated at the same time. The first and second global coordinates to be added at this time are the determination results for the same position. However, the first and second global coordinates may not coincide with each other due to the detection accuracy of the two intelligent cameras 102And the error generated in the processing for determining the first and second global coordinates.

Figure 7:
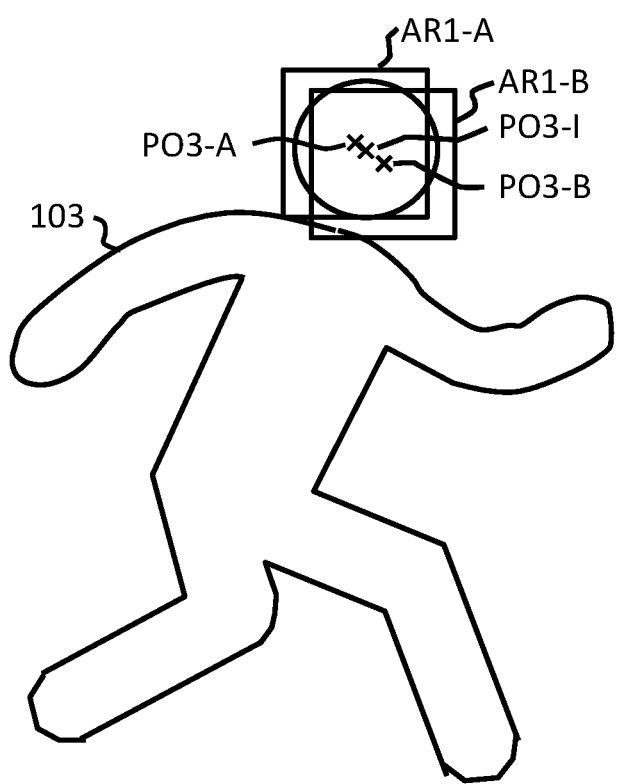
FIG. 7 is a diagram showing a situation in which the positions of a person, detected by two intelligent cameras are not coincident with each other.

FIG. 7 is a diagram showing an example of a state in which the detection positions determined by the two intelligent cameras 102Are not coincident with respect to the one person 103. Although the two intelligent cameras 102 photograph the person 103 from different direction each other, FIG. 7 shows a state in which a deviation occurs in the detection position when the person 103 is photographed under the same condition for convenience. The first detection positions PO3-A and the second detection position PO3-B in FIG. 3 are shifted from the ideal detection position PO3-I.

Figure 8:
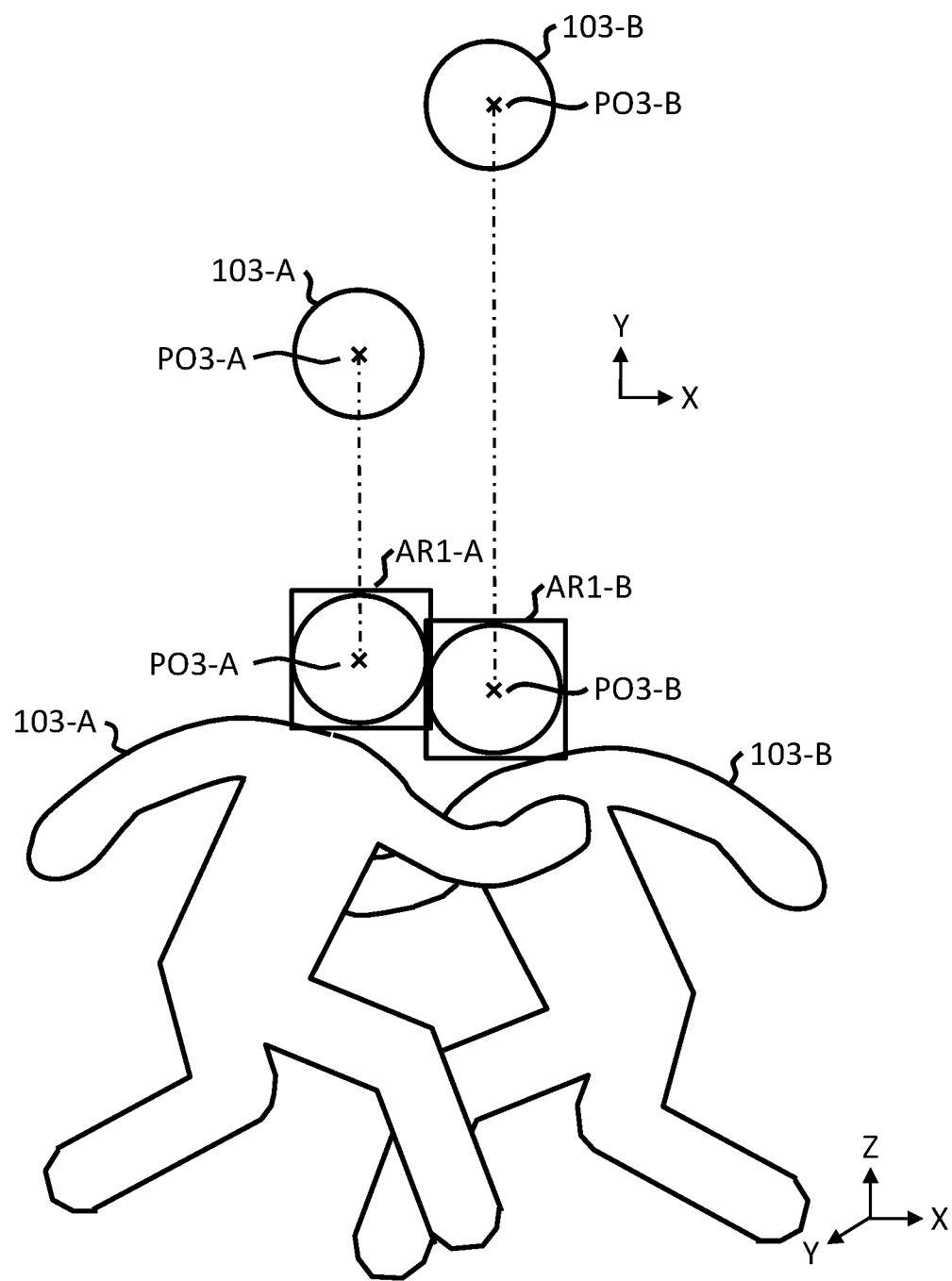
FIG. 8 is a diagram showing a difference in positions of the persons passing each other, detected by the two intelligent cameras.

In addition, when two intelligent cameras 102 individually detect two persons 103, the first and second global coordinates do not coincide with each other. FIG. 8 is a diagram showing an example of a difference in detection positions determined by the two intelligent cameras 102 with respect to two persons 103-A and 103-B which are different from each other. Note that although the two intelligent cameras 102 photograph persons 103-A and 103-B in different directions, FIG. 8 shows the difference between the detection positions PO3-A and PO3-B in the case where the persons 103-A and 103-B are photographed from the intelligent camera 102 installed under the same conditions for convenience. As shown in FIG. 8, the individual two persons 103 are in a separate position, and the heads are usually sufficiently separated from each other, so that the detection positions PO3-A and PO3-B are greatly separated from each other.

The deviation between the detection positions PO3-A and PO3-B caused by the error is very small with respect to the difference between the detection positions PO3-A and PO3-B of the two different persons 103. As ACT23, the processor 11 checks whether or not the determined distance is within a predetermined error range. The error range may be appropriately determined in consideration of the performance of the intelligent camera 102And the like. If it is determined that the error is within the error range, the processor 11 proceeds to ACT24.

As ACT24, the processor 11 determines an intermediate position between the first global coordinates and the second global coordinates. For example, if X1A is equal to or less than X1B, then the processor 1 sets X1S=X1A, X1L=X1B, and if X1B is less than X1A, X1S=X1B, X1L=X1A. For example, if Y1A is equal to or less than Y1B, the processor 11 sets Y1S=Y1A and Y1L=Y1B, and if Y1B is less than Y1A, Y1S=Y1B, Y1L=Y1A. For example, if Z1A is equal to or less than Z1B, the processor 11 sets Z1S=Z1A, Z1L=Z1B, and if Z1B is less than Z1A, it sets Z1S=Z1B, Z1L=Z1A. Then, the processor 11 calculates X1, Y1, and Z1, for example, according to the following equation.

$$X1=X1S+(X1L-X1S)/2$$

$$Y1=Y1S+(Y1L-Y1S)/2$$

$$Z1=Z1S+(Z1L-Z1S)/2$$

As ACT 25, the processor 11 converts the latest first and second global coordinates in the first and second tracking data into global coordinates (X1, Y1, Z1).

As ACT 26, the processor 11 checks whether or not the object codes set in the respective fields F1 of the first and second tracking data are coincident with each other. Then, when the processor 11 determines that the two object codes are different from each other, the process proceeds to ACT27. As ACT27, the processor 11 matches the object codes set in the respective fields F1 of the first and second tracking data. For example, the processor 11 changes the object code set in one field F1 of the first and second tracking data to the object code set in the other field F1. More specifically, the processor 11 rewrites the object code set in the field F1 of the tracking data in which the time data set in the field F3 is newer to the object code set in the field F1 of the other tracking data. Alternatively, the processor 11 may set a new object code which is different from the object code set in the field F1 of all the tracking data including the first and the second tracking data, to the field F1 of each of the first and second tracking data.

After this, the processor 11 returns to the standby state of ACT21. Note that if the distance determined by ACT22 is outside the error range, the processor 11 determines NO in ACT23, and returns to the standby state of ACT21 without executing from ACT24 to ACT27. That is, the processor 11 determines the global coordinates determined by the first tracking processing and the second tracking processing and the object code respectively set in the first tracking data and the second tracking data, valid without changing. In addition, when the object codes set in the respective fields F1 of the first and second tracking data coincide with each other, the processor 11 determines YES in ACT 26, and returns to the standby state of ACT21 without executing ACT27.

Figure 9:
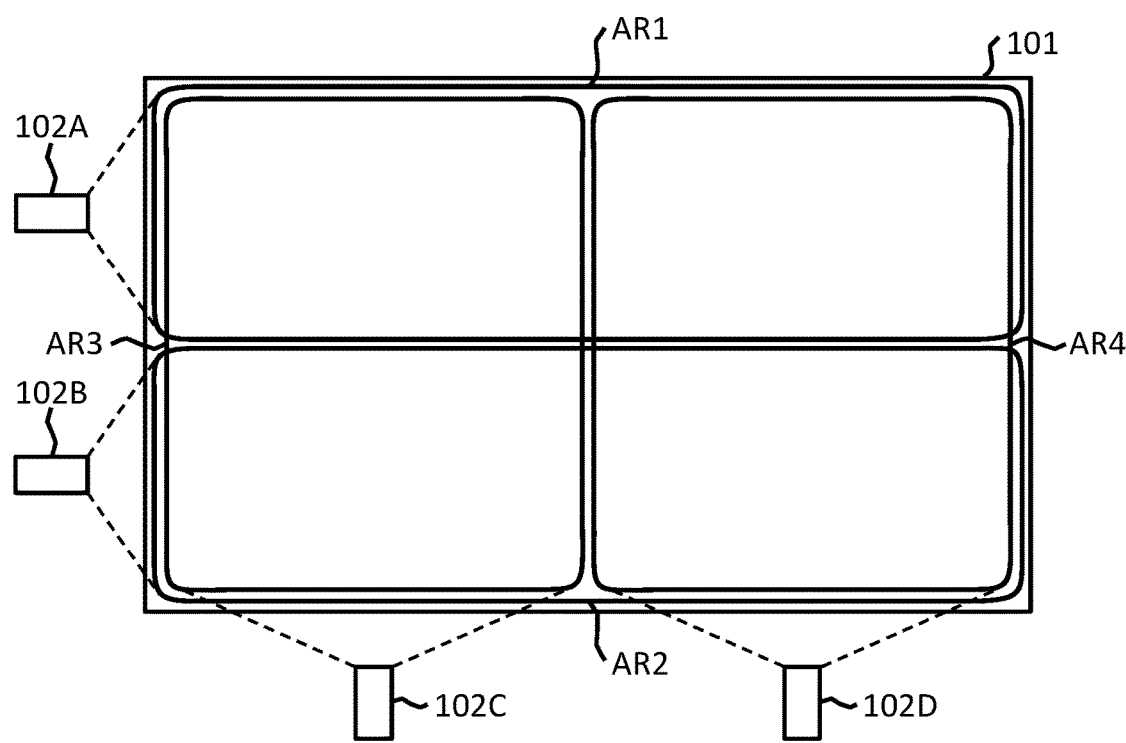
FIG. 9 is a plan view schematically showing photographing ranges of intelligent cameras.

Next, the manner in which the tracking data is corrected by the correction processing will be described specifically. FIG. 9 is a plan view schematically showing the photographing ranges of the intelligent cameras 102. FIG. 9 shows the XY plane in the global coordinate system shown in FIG. 1. FIG. 9 shows the floor 101 photographed by the four intelligent cameras 102. In order to facilitate the distinction between the four intelligent cameras 102, 102A, 102B, 102C and 102D are used as the reference numerals.

Figure 10:
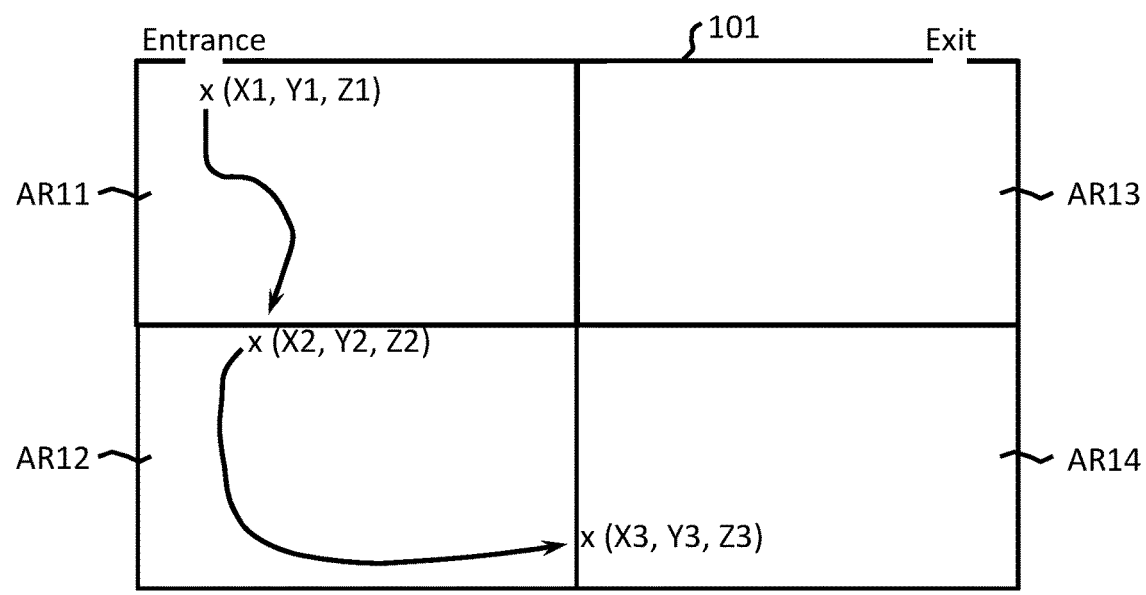
FIG. 10 is a diagram showing formation of a tracking area.

The intelligent cameras 102A, 102B, 102C, and 102D capture the regions AR1, AR2, AR3, and AR4, respectively. Each half of the regions AR1 and AR2 overlaps each half of the regions AR3 and AR4. Thus, the floor 101 is formed with four tracking areas for tracking the person 103 by two intelligent cameras 102. FIG. 10 is a diagram showing formation of the tracking area. The tracking area AR11 is a tracking area in which the intelligent cameras 102A and 102C are used. The tracking area AR12 is a tracking area in which the intelligent cameras 102B and 102C are used. The tracking area AR13 is a tracking area in which the intelligent cameras 102A and 102D. The tracking area AR14 is a tracking area in which the intelligent cameras 102B and 102D are used.

Consider a case where, as indicated by an arrow in FIG. 10, at the time TI1, the position of the person 103 is (X1, Y1, Z1) in the global coordinates, and then he reaches a position (X2, Y2, Z2) at the time TI2, and then he reaches a position (X3, Y3, Z3) at the time TI3.

Figure 11:
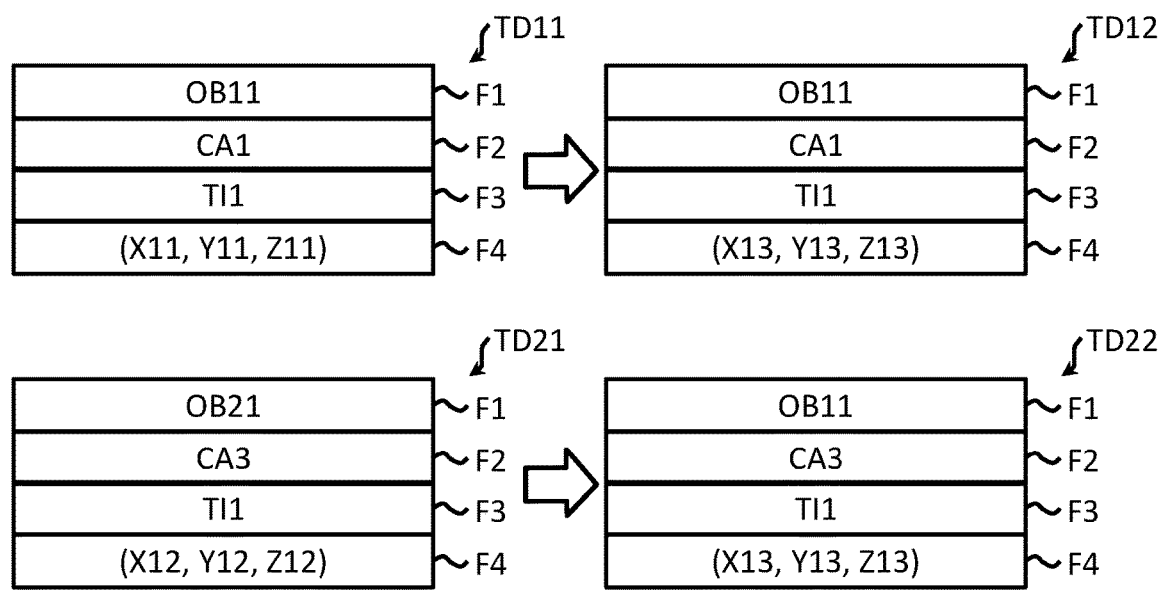
FIG. 11 is a diagram showing correction of tracking data.

FIG. 11 is a diagram showing how the tracking data is corrected with respect to time TI1. In the tracking processing by the intelligent camera 102A, the processor 11 generates a tracking data TD11 shown in FIG. 11. In this example, the object code is "OB11". The camera code of the intelligent camera 102A is "CA1". The position of the person 103 is the coordinates (X1, Y1, Z1), but it is determined to be the coordinate (X11, Y11, Z11) due to error. Since the determination of the position at the time TI1 is the first determination in the tracking processing by the intelligent camera 102A, the coordinates (X11, Y11, Z11) are set in the field F4.

In the tracking processing with respect to the intelligent camera 102C, the processor 11 generates the tracking data TD21 shown in FIG. 11. In this example, the object code is "OB21". The camera code of the intelligent camera 102C is "CA3". The position of the person 103 is the coordinates (X1, Y1, Z1), but it is determined to be coordinate (X12, Y12, Z12) due to error. Since the determination of the position at the time TI1 is the first determination in the tracking processing by the intelligent camera 102C, the coordinates (X12, Y12, Z12) are set to the field F4.

Then, the tracking data TD11 is corrected to the tracking data TD12 by the correction processing by the processor 11, and the tracking data TD21 is corrected to the tracking data TD22. In the tracking data TD12 and T22, the respective fields F4 are changed to coordinates (X13, Y13, Z13) as intermediate positions between coordinates (X11, Y11, Z11) and coordinates (X12, Y12, Z12). The field F1 of the tracking data TD22 is changed to "OB11" which is the object code set in the field F1 of the tracking data TD12.

At the time TI2, the person 103 moves from the tracking area AR11 to the tracking area AR12. That is, the person 103 is out of the photographing area AR1 corresponding to the intelligent camera 102A. Accordingly, the tracking processing by the intelligent camera 102A for the person 103 has been completed. Instead, since the person 103 enters the photographing area AR2 of the intelligent camera 102B, the tracking processing by the intelligent camera 102B for the person 103 is started. Since the person 103 does not go out of the photographing area AR3 corresponding to the intelligent camera 102C, the tracking processing by the intelligent camera 102C is continued. For this reason, with respect to time TI2, the tracking processing by the intelligent camera 102C and the tracking processing by the intelligent camera 102B add the determination results of position to each tracking data.

Figure 12:
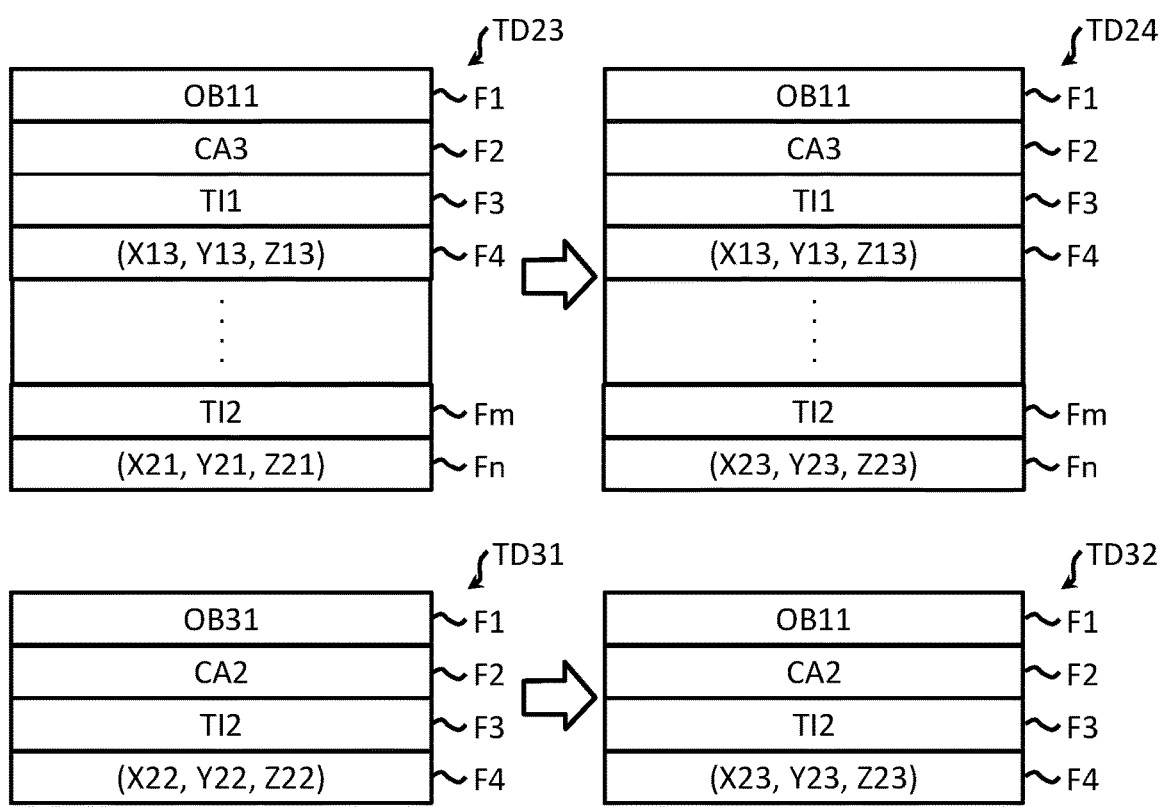
FIG. 12 is a diagram showing correction of the tracking data.

FIG. 12 is a diagram showing the tracking data for the time TI2. In the tracking processing by the intelligent camera 102C, the processor 11 adds a plurality of sets of fields to the tracking data TD22 shown in FIG. 11 as the person 103 moves, and sets time data indicating time 112 and coordinates determined at time 112 in the last two fields Fm and Fn. The position of the person 103 at the time TI2 is the coordinates (X2, Y2, Z2), but it is determined to be the coordinates (X21, Y21, Z21) due to error.

In the tracking processing by the intelligent camera 102B, the processor 11 generates the tracking data TD31 shown in FIG. 12. In this example, the object code is "OB31". The camera code of the intelligent camera 102B is "CA2". Although the position of the person 103 is the coordinates (X2, Y2, Z2), but it is determined to be the coordinate (X22, Y22, Z22) due to an error. Since the determination of the position at the time 112 is the first determination in the tracking processing by the intelligent camera 102B, the coordinates (X22, Y22, Z22) are set to the field F4.

Then, the tracking data TD23 is corrected to the tracking data TD24 by the processor 11, and the tracking data TD31 is corrected to the tracking data TD32. In the tracking data TD24, the field Fn is changed to the coordinate (X23, Y23, Z23) as an intermediate position between the coordinate (X21, Y21, Z21) and the coordinate (X22, Y22, Z22). In the tracking data TD32, the field F4 is also changed to the coordinate (X23, Y23, Z23) as an intermediate position between the coordinate (X21, Y21, Z21) and the coordinate (X22, Y22, Z22). The field F1 of the tracking data TD32 is changed to "OB11", which is the object code set in the field F1 of the tracking data TD24.

At the time TI3, the person 103 moves from the tracking area AR12 to the tracking area AR13. That is, the person 103 is out of the photographing area AR3 corresponding to the intelligent camera 102C. As a result, the tracking processing by the intelligent camera 102C for the person 103 has been finished. Instead, since the person 103 enters the imaging area AR4 corresponding to the intelligent camera 102D, the tracking processing by the intelligent camera 102D for the person 103 is started. Since the person 103 does not exit from the photographing area AR2 corresponding to the intelligent camera 102B, the tracking processing by the intelligent camera 102D is continued.

For this reason, regarding the time TI3, the tracking processing by the intelligent camera 102B and the tracking processing by the intelligent camera 102D add the determination results of position to each tracking data related to the respective tracking processing. Tracking data relating to the tracking processing by the intelligent camera 102B at this time includes a plurality of sets of time data and position data as shown in the tracking data TD23 shown in FIG. 12. Tracking data relating to the tracking processing by the intelligent camera 102D includes one set of time data and position data as shown in the tracking data TD31 shown in FIG. 12. In this case as well, each tracking data are corrected in the same manner as the time TI2.

As described above, according to the tracking device 1, since the position of the person 103 is determined in consideration of the distance to the person 103 measured by the intelligent camera 102, the accuracy of determining the position is improved as compared to the case where only the moving image photographed by the camera is used. As a result, the movement of the person 103 can be tracked with high accuracy by the tracking device 1.

According to the tracking device 1, since the tracking data in which the determined positions are recorded in time series is generated, the movement of the person 103 can be easily tracked. Further, when the same person 103 is detected at the same time by the two intelligent cameras 102, the tracking data are corrected in consideration of the two global coordinates determined by the information processing of the first embodiment from the two detection data. Thus, even when the determination is made with high accuracy as described above, it is possible to perform accurate position determination by correcting remaining errors.

In the tracking device 1, when the tracking data is corrected as described above, the object codes of the two tracking data to be corrected are unified. As a result, it is possible to identify that the plurality of tracking data is the data relating to the same person 103. Based on the plurality of corresponding tracking data, the movement of the person in a wide range over the photographing range of the plurality of intelligent cameras 102 can be tracked. When the positions of different persons 103 are determined at the same time, since the tracking data for each person 103 is not corrected, and the object code is not unified, therefore the individual movement of each of the individual persons 103 can be identified based on the plurality of tracking data. In this way, it is possible to manage whether the plurality of positions determined at the same time by using the plurality of intelligent cameras 102 are related to the same person 103 or the plurality of persons 103 separate from each other. That is, the plurality of tracking data represents the result of determining the position relating to the same object at the time based on the determination result of the plurality of positions determined within the error range with respect to the same time, and determining the position relating to the different object at the time based on the determination result of the plurality of positions determined as outside the error range at the time of the simultaneous time.

According to the tracking device 1, since the history database storing the tracking data is generated, it is possible to easily recognize the entry and exit of the person 103 into and from the photographing region of the intelligent camera 102 and past movement trajectory of the person 103.

According to the tracking device 1, the position of the head of the person 103 is determined as coordinates in the 3D global coordinate system. Therefore, it is possible to recognize the behavior of the person 103 standing or crouching down to the floor on the basis of the Z coordinate. The result of the recognition is useful for specifying a commodity that the person 103 has taken out from the display shelf of the commodity.

In addition, according to the tracking device 1, when the abnormality of the detection data output from the intelligent camera 102 is suspected, the distance data of the detection data is not used for the position determination. Thus, even when a distance measured by the intelligent camera 102 is not accurate, it is possible to suppress a decrease in accuracy of the position determination.

According to the tracking device 1, even when the abnormality of the detection data output from the intelligent camera 102 is suspected, the region data of the detection data is used for the position determination. For this reason, in the direction from the intelligent camera 102 in which the person 103 is located, the latest detection result is reflected in the determination of the position, so that it is possible to suppress reduction in accuracy of the position determination in comparison with the case where all of the detection data is not used.

According to the tracking device 1, it is determined whether or not the detection data output from the intelligent camera 102 is abnormal based on the average moving speed between the two detected positions determined by the two times consecutive position determinations. For this reason, even when the determined distance becomes large due to absence of detection because of an intervening obstacle between the person and the intelligent camera 102, the new detection data is not erroneously determined to be abnormal.

This embodiment can be implemented in a variety of ways as follows. ACT 24 and ACT 25 in FIG. 6 may be omitted.

For example, the change of the object code in ACT27 may not be performed, and a determination result of a plurality of positions can be managed as a determination result for the same object by another processing as described below.

(1) Management data may be generated by associating the object codes set in the respective fields F1 of the first and second tracking data with each other.

(2) A new field in which the object code set in the field F1 of the first tracking data is set may be added to the second tracking data, and a new field in which the object code set in the field F2 of the second tracking data is set may be added to the first tracking data.

Instead of changing the object code in ACT27, a plurality of tracking data for the same person 103 may be determined in the same manner as described above by post-processing.

A plurality of tracking data for the person 103 may be integrated to generate one tracking data.

The update of the tracking data in ACT11 may be separated from the tracking processing shown in FIG. 2, and the global coordinates of one position may be added to one tracking data in accordance with a plurality of positions determined within the error range at the same time.

The position of the person 103 may be tracked as coordinates in a 2D global coordinate system set as a horizontal plane in the sales room 101. In this case as well, it is possible to improve the accuracy of the position detection in comparison with the case where the distance data is not used.

The abnormality of the detection data may be determined based on the moving distance per unit time. If the intelligent camera 102 outputs the detection data at a predetermined time interval, the processor 11 may determine the abnormality of the detection data based on the distance between the previous detection position PO3 and the current detection position PO3.

The abnormality of the detection data may be determined by comparing the distance between the two detection positions determined by two consecutive position determinations to a threshold value. However, in this case, it is preferable to apply a larger threshold value as the time difference between the two successive position determinations is larger.

The processor 11 may not use all of the detection data determined to be abnormal in the position determination. That is, when the processor 11 determines YES in ACT8 in FIG. 2, for example, the processor 11 may return to ACT2.

In this case, however, the temporal resolution of the position determination is lower than that in the above embodiment.

The intelligent camera 102 may determine a recognition area as a region other than the head, such as the torso of the person 103, or a region including the whole body of the person 103.

The intelligent camera 102 may detect any object other than the person 103, such as a shopping cart, for example. In this case, the tracking device 1 is used as a device for tracking an object other than the person 103 detected by the intelligent camera 102.

The intelligent camera 102 may be incorporated in the tracking device 1.

The facility to which the movement of the person 103 is to be monitored is not limited to the store 100, and may be any building such as a museum or any facility such as a road and a park.

The processor 11 may acquire the detection data by reading from a storage medium for storing the detection data output from the intelligent camera 102. The detection data in this case may be read directly by the processor 11 or indirectly via another information processing device.

The processing shown in FIG. 6 may be integrated with the processing shown in FIG. 2. For example, the processor 11 determines whether or not other tracking data are updated simultaneously after ACT11. If the processor 11 has been updated simultaneously, the processor 1 executes ACT22 to ACT27 in FIG. 6. However, the processor 11 corrects only the global coordinates added to the tracking data immediately before the ACT11 in the same information processing. In this case, the processor 11 returns to ACT2 in FIG. 2 when the other tracking data has not been updated simultaneously, or when NO is determined in ACT23, or when YES is determined in ACT26, or when the ACT27 has been completed.

For a single person 103, the correction may be made based on three or more global coordinates determined by three or more intelligent cameras 102. That is, for example, the processor 11 determines the global coordinates after correction of the plurality of global coordinates as intermediate positions of a plurality of global coordinates that are within the error range.

The plurality of information processing shown in FIG. 2 and the information processing shown in FIG. 6 may be distributed by a plurality of information processing devices. In this case, the tracking device is configured by a combination of the plurality of information processing devices.

Each function of the information processing may be performed by hardware that executes information processing that is not based on a program such as a logic circuit or the like. Each of the functions described above may also be performed by combining software control with hardware such as the logic circuit described above.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. These embodiments and variations thereof are included in the scope and spirit of the invention and are included within the scope of the appended claims and their equivalents.

What is claimed is:

1. A tracking device for tracking a location of an object within a facility, comprising:

an interface circuit connectable to a plurality of cameras
including a first and a second camera, each of which
configured to:
acquire an image, and
upon detection of a head of a person within the acquired
image, determine a location of the head of the person
within the image as a location of an object to be
tracked, and further determine a distance between
the object and the camera and a time when the image
is acquired;
a memory that stores
first coordinates that indicate a location where each of
the cameras is installed with respect to a reference
point predetermined in the facility, and
a first direction towards which each of the cameras
faces; and
a processor configured to
upon receipt of the location of the object within the
image, the distance, and the time from each of the
cameras,
calculate a second direction from the camera to the
object in the facility based on the stored first
direction and the received location of the object
within the image,
based on the calculated second direction and the
received distance, calculate second coordinates
indicating a location of the object with respect to
the location where the camera is installed,
based on the stored first coordinates and the calculated second coordinates, calculate third coordinates indicating a location of the object with
respect to the reference point of the facility, and
store, in the memory, the calculated third coordinates
together with the received time,
wherein the processor is further configured to
when a first location represented by the third coordinates calculated from the image acquired by the first
camera and a second location represented by the
third coordinates calculated from the image acquired
by the second camera are stored in the memory in
association with a same time,
calculate a distance between the first and second
locations, and
when the distance falls within a predetermined range,
recalculate a location of the object based on the first and
second locations.

2. The tracking device according to claim 1, wherein
the processor is configured to recalculate the location of
the object by calculating an intermediate position of the
first and second locations.

3. The tracking device according to claim 1, wherein
the second coordinates are polar coordinates indicating
the location of the object in the facility with respect to
the location where each of the cameras is installed.

4. The tracking device according to claim 3, wherein
the first coordinates are absolute coordinates indicating
the location where each of the cameras is installed in
the facility with respect to the reference point of the
facility, and
the third coordinates are absolute coordinates indicating
the location of the object in the facility with respect to
the reference point of the facility.

5. The tracking device according to claim 1, wherein
the facility is a sales room of a store.

6. The tracking device according to claim 1, wherein
the processor is configured to calculate a moving velocity of the object based on the
calculated third coordinates and previous third coordinates indicating a previous location of the object,
and
determine that the received second direction is erroneous when the moving velocity is equal to or greater
than a predetermined threshold.

7. The tracking device according to claim 6, wherein
the processor is configured to, upon determining that the
second direction is erroneous, correct the calculated
second coordinates using a previous second direction
acquired by the camera, and recalculate the third coordinates using the corrected second coordinates.

8. The tracking device according to claim 1, wherein
the processor is configured to repeat a process of the
calculation of the second direction, the second coordinates, and the third coordinates, and the storage thereof
as long as the object is located within the image
acquired by each of the cameras.

9. The tracking device according to claim 8, wherein
the processor is configured to
determine that a previous location of the object is
within an edge region of the image, and
when the previous location is within the edge region
and a predetermined time has elapsed without receiving the location and the distance from each of the
cameras, stop repeating the process.

10. A method for tracking a location of an object within
a facility using a plurality of cameras including a first and a
second camera, the method comprising:
storing
first coordinates that indicate a location where each of
the cameras is installed with respect to a reference
point predetermined in the facility, and
a first direction towards which each of the cameras
faces;
acquiring an image by each of the cameras, and upon
detection of a head of a person within the acquired
image, determining a location of the head of the person
within the acquired image as a location of an object to
be tracked, and further determining a distance between
the object and the camera and a time when the image
is acquired;
upon receipt of the location of the object within the image,
the distance, and the time from each of the cameras,
calculating a second direction from the camera to the
object in the facility based on the stored first direction and the received location of the object within the
image,
based on the calculated second direction and the
received distance, calculating second coordinates
indicating a location of the object with respect to the
location where the camera is installed,
based on the stored first coordinates and the calculated
second coordinates, calculating third coordinates
indicating a location of the object with respect to the
reference point of the facility, and
storing the calculated third coordinates together with
the received time; and
when a first location represented by third coordinates
calculated from the location of the first camera and a
second location represented by third coordinates calculated from the location of the second camera are
stored in association with a same time,
calculating a distance between the first and second
locations, and when the distance falls within a predetermined range, recalculating a location of the object based on the first and second locations.

11. The method according to claim 10, wherein the recalculated location of the object is an intermediate position of the first and second locations.

12. The method according to claim 10, wherein the second coordinates are polar coordinates indicating the location of the object in the facility with respect to the location where each of the cameras is installed.

13. The method according to claim 12, wherein the first coordinates are absolute coordinates indicating the location where each of the cameras is installed in the facility with respect to the reference point of the facility, and
the third coordinates are absolute coordinates indicating the location of the object in the facility with respect to the reference point thereof.

14. The method according to claim 10, wherein the facility is a sales room of a store.

15. The method according to claim 10, further comprising:
calculating a moving velocity of the object based on the calculated third coordinates and previous third coordinates indicating a previous location of the object; and
determining that the received second direction is erroneous when the moving velocity is equal to or greater than a predetermined threshold.

16. The method according to claim 15, further comprising:
upon determining that the second direction is erroneous, correcting the calculated second coordinates using a previous second direction acquired by the camera, and recalculating the third coordinates using the corrected second coordinates.

17. The method according to claim 10, further comprising:
repeating a process of the calculation of the second direction, the second coordinates, and the third coordinates, and the storage thereof as long as the object is located within the image acquired by each of the cameras.

18. A tracking system for tracking a location of an object, comprising:
a plurality of cameras including a first and a second camera, each configured to:
acquire an image, and
upon detection of a head of a person within the acquired image, determine a location of the head of the person within the acquired image as a location of an object to be tracked, and further determine a distance between the object and the camera and a time when the image is acquired; and
a tracking device including
a memory that stores
first coordinates that indicate a location where each of the cameras is installed with respect to a reference point predetermined in the facility, and
a first direction towards which each of the cameras faces, and
a processor configured to
upon receipt of the location of the object within the image, the distance, and the time from each of the cameras,
calculate a second direction from the camera to the object in the facility based on the stored first direction and the received location of the object within the image,
based on the calculated second direction and the received distance, calculate second coordinates indicating a location of the object with respect to the location where the camera is installed,
based on the stored first coordinates and the calculated second coordinates, calculate third coordinates indicating a location of the object with respect to the reference point of the facility, and
store, in the memory, the calculated third coordinates together with the received time,
wherein the processor is further configured to
when a first location represented by the third coordinates calculated from the image acquired by the first camera and a second location represented by the third coordinates calculated from the image acquired by the second camera are stored in the memory in association with a same time,
calculate a distance between the first and second locations, and
when the distance falls within a predetermined range, recalculate a location of the object based on the first and second locations.

19. The tracking device according to claim 5, wherein the processor is further configured to recognize a particular action performed by the person at a same location in the store based on a change in one of the calculated third coordinates.

20. The tracking device according to claim 19, wherein said one of the calculated third coordinates corresponds to a height with respect to a floor of the sales room of the store.

* * * * *